United States Patent
Yeom

(10) Patent No.: US 11,831,463 B2
(45) Date of Patent: Nov. 28, 2023

(54) BMS, ECU, AND COMMUNICATION METHOD BETWEEN BMS AND ECU

(71) Applicant: LG CHEM, LTD., Seoul (KR)

(72) Inventor: Incheol Yeom, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 430 days.

(21) Appl. No.: 17/282,867

(22) PCT Filed: Jan. 21, 2020

(86) PCT No.: PCT/KR2020/001028
§ 371 (c)(1),
(2) Date: Apr. 5, 2021

(87) PCT Pub. No.: WO2020/153719
PCT Pub. Date: Jul. 30, 2020

(65) Prior Publication Data
US 2021/0351953 A1   Nov. 11, 2021

(30) Foreign Application Priority Data

Jan. 21, 2019   (KR) ........................ 10-2019-0007629

(51) Int. Cl.
*G06F 1/26*         (2006.01)
*H04L 12/40*     (2006.01)
(Continued)

(52) U.S. Cl.
CPC .......... *H04L 12/40045* (2013.01); *H04L 5/16* (2013.01); *H04L 12/40039* (2013.01);
(Continued)

(58) Field of Classification Search
CPC ................. H04L 12/40045; H04L 5/16; H04L 12/40039; H04L 12/40136; H04L 25/20;
(Continued)

(56) References Cited

U.S. PATENT DOCUMENTS 9,851,772 B2   12/2017   Dwelley et al.
2008/0186870 A1*   8/2008   Butts .................. H04L 43/0847
370/252

(Continued)

FOREIGN PATENT DOCUMENTS

CN   102386637 A   3/2012
CN   103809476 A   5/2014
(Continued)

OTHER PUBLICATIONS

Extended European Search Report dated Oct. 8, 2021, of the corresponding European Patent Application No. 20745933.0.
(Continued)

*Primary Examiner* — Volvick Derose
(74) *Attorney, Agent, or Firm* — Birch, Stewart, Kolasch & Birch, LLP

(57) ABSTRACT

Disclosed is an ECU that transmits a pulse signal with a modulated frequency and duty cycle to a BMS so as to instruct a switching operation of a control target relay from among a plurality of relays and a BMS to control a switching operation of the corresponding relay according to the modulating pulse signal received from the ECU and control a first voltage change period to a communication line.

11 Claims, 3 Drawing Sheets

(51) Int. Cl.
*H04L 5/16* (2006.01)
*H04L 25/20* (2006.01)
*H04L 25/49* (2006.01)
*G06F 1/3203* (2019.01)

(52) U.S. Cl.
CPC ........ *H04L 12/40136* (2013.01); *H04L 25/20* (2013.01); *H04L 25/4902* (2013.01); *G06F 1/3203* (2013.01); *H04L 2012/40215* (2013.01); *H04L 2012/40273* (2013.01)

(58) Field of Classification Search
CPC ....... H04L 25/4902; H04L 2012/40215; H04L 2012/40273; H04L 12/40169; H04L 12/4013
USPC .......................................................... 713/300
See application file for complete search history.

(56) References Cited

U.S. PATENT DOCUMENTS

| | | | | |
|---|---|---|---|---|
| 2009/0063909 | A1* | 3/2009 | Fredriksson | H04L 43/00 714/49 |
| 2010/0280634 | A1* | 11/2010 | Murashige | H04L 12/40176 700/82 |
| 2010/0305723 | A1* | 12/2010 | Koyama | H04L 12/40039 700/90 |
| 2012/0173071 | A1 | 7/2012 | Ikegami | |
| 2013/0069594 | A1 | 3/2013 | Jung | |
| 2014/0252847 | A1* | 9/2014 | Yang | B60L 50/51 307/115 |
| 2014/0347013 | A1* | 11/2014 | Kim | H02J 7/0016 320/134 |
| 2017/0117532 | A1* | 4/2017 | Frias | H01M 10/486 |
| 2017/0267195 | A1 | 9/2017 | Liu et al. | |
| 2018/0056983 | A1* | 3/2018 | Yang | B60W 20/13 |
| 2018/0154776 | A1* | 6/2018 | Gardien | G01R 31/52 |
| 2018/0205315 | A1 | 7/2018 | Giuliano et al. | |
| 2019/0067957 | A1* | 2/2019 | Yeom | B60L 53/66 |
| 2020/0052346 | A1* | 2/2020 | Park | H01M 10/425 |
| 2021/0396815 | A1* | 12/2021 | Bang | G01R 31/392 |
| 2022/0232110 | A1* | 7/2022 | Choi | H04L 12/40013 |
| 2023/0216729 | A1* | 7/2023 | Lee | H04L 41/0695 370/296 |
| 2023/0235322 | A1* | 7/2023 | Turunen | C12N 15/111 514/44 A |
| 2023/0238090 | A1* | 7/2023 | Ginsburg | G16H 10/60 705/3 |

FOREIGN PATENT DOCUMENTS

| | | |
|---|---|---|
| CN | 104354596 B | 9/2016 |
| CN | 109075403 A | 12/2018 |
| JP | 2004-328488 A | 11/2004 |
| JP | 2009-154661 A | 7/2009 |
| JP | 2011-65402 A | 3/2011 |
| JP | 2013-172200 A | 9/2013 |
| JP | 2014-230488 A | 12/2014 |
| JP | 2017-51036 A | 3/2017 |
| KR | 10-2011-0097221 A | 8/2011 |
| KR | 10-2011-0132977 A | 12/2011 |
| KR | 10-2013-0137975 A | 12/2013 |
| KR | 10-2014-0110694 A | 9/2014 |
| KR | 10-1526817 B1 | 6/2015 |
| KR | 10-2017-0024310 A | 3/2017 |
| KR | 10-2018-0087013 A | 8/2018 |

OTHER PUBLICATIONS

International Search Report issued in PCT/KR2020/001028 (PCT/ISA/210), dated May 6, 2020.

* cited by examiner

BMS, ECU, AND COMMUNICATION METHOD BETWEEN BMS AND ECU

CROSS-REFERENCE TO RELATED APPLICATION(S)

This application claims priority to and the benefit of Korean Patent Application No. 10-2019-0007629 filed in the Korean Intellectual Property Office on Jan. 21, 2019, the entire contents of which are incorporated herein by reference.

TECHNICAL FIELD

The present disclosure relates to a battery management system (BMS), an electronic control unit (ECU), and a communication method between a BMS and an ECU.

BACKGROUND ART

In a vehicle in a normal state, a battery management system (BMS) of a battery installed in the vehicle receives a relay control instruction from an electronic control unit (ECU) of the vehicle through a CAN communication, analyzes the received relay control instruction, and controls a relay.

When the CAN communication between the higher-level ECU and the BMS has a defect, the higher-level ECU loses a control right to the relay, and in correspondence to this, the BMS forcibly opens the relay regardless of the higher-level ECU, and has the battery system enter a safe state.

This may prevent the battery system from being abnormally controlled, but the vehicle fails to receive power from the battery system. The vehicle may not drive normally or may drive but in a limited way because the power supply from the battery system is blocked. A user of the vehicle may then feel uneasy or fall into risky situations.

DISCLOSURE

Technical Problem

The present invention provides a BMS and an ECU for communication between the ECU and the BMS when there is a CAN communication disruption between the ECU and the BMS, and a communication method therebetween.

Technical Solution

An exemplary embodiment of the present invention provides a battery management system (BMS) connected to an electronic control unit (ECU) by CAN communication and half-duplex communication through a single line, including: an input capture unit (ICU) configured to, when the CAN communication has a defect, measure a frequency and a duty cycle of a modulating pulse signal through the single line, and generate relay control information; a relay control module configured to generate a relay control signal for controlling a switching operation of a corresponding relay from among a plurality of relays based on the relay control information, and generate relay control result information for instructing a control result of the corresponding relay; and a digital input output (DIO) module configured to change a voltage at the single line for a period based on the relay control result information to cause the ICU to transmit relay control result information to the ECU, wherein the plurality of relays may be electrically connected between a battery device including the BMS and an electrical load.

The relay control module may generate relay control request information and may transmit the relay control request information to the DIO module, and the DIO module may change the voltage at the single line according to the relay control request information.

The relay control module may include a plurality of relay drivers for transmitting a plurality of relay control signals to the plurality of relays, and the plurality of relays may be respectively opened or closed according to a corresponding relay control signal from among the plurality of relay control signals.

The relay control module may control a corresponding relay from among the plurality of relays according to the relay control information, and may generate the relay control result information for instructing another period according to a state of the corresponding relay.

A frequency of the modulating pulse signal may be different for the plurality of relays, and a duty cycle of the modulating pulse signal may be different according to respective states of the plurality of relays.

Another embodiment of the present invention provides an electronic control unit (ECU) connected to a battery management system (BMS) by CAN communication and half-duplex communication through a single line, including: a modulating signal generator configured to, when the CAN communication is bad, generate a modulating pulse signal with a frequency and a duty cycle according to a relay control instruction on a control target relay from among a plurality of relays and a state of the control target relay; and an input capture unit (ICU) configured to detect a change of voltage at the single line by measuring a frequency and a duty cycle of the single line, wherein the plurality of relays may be respectively electrically connected between a battery device of the BMS and a corresponding electrical load.

The ICU may measure a frequency and a duty cycle of the single line, and may output the relay control request information to the ECU when detecting a change of voltage of the single line for a period that corresponds to relay control request information.

The ECU may generate a relay control instruction according to the relay control request information, and may output the relay control instruction to the modulating signal generator.

Yet another embodiment of the present invention provides a communication method between an electronic control unit (ECU) and a battery management system (BMS) connected by CAN communication and half-duplex communication through a single line, including: generating, by the ECU, a modulating pulse signal with a frequency and a duty cycle according to a relay control instruction on a control target relay from among a plurality of relays and a state of the control target relay, when the CAN communication has a defect; generating, by the BMS, relay control information by measuring the frequency and the duty cycle of the modulating pulse signal; generating, by the BMS, a relay control signal for controlling a switching operation of the control target relay from among a plurality of relays based on the relay control information; generating, by the BMS, relay control result information for instructing a control result of the control target relay; changing, by the BMS, a voltage of the single line to transmit relay control result information to the ECU for a period based on the relay control result information; and detecting, by the ECU, a change of the voltage at the single line by measuring a frequency and a duty cycle of the single line. The plurality of relays may be electrically connected between a battery device including the BMS and an electrical load.

The communication method may further include: changing, by the BMS, the voltage at the single line according to relay control request information; measuring, by the ECU, the frequency and the duty cycle of the single line, and detecting the change of the voltage at the single line for a period that corresponds to the relay control request information; and generating, by the ECU, a relay control instruction based on the relay control request information when the change of the voltage at the single line is detected.

Advantageous Effects

The BMS and the ECU provides communication between the ECU and the BMS, even when there is a CAN communication problem between the ECU and the BMS, and a communication method therebetween, are provided.

MODE FOR INVENTION

Figure 1:
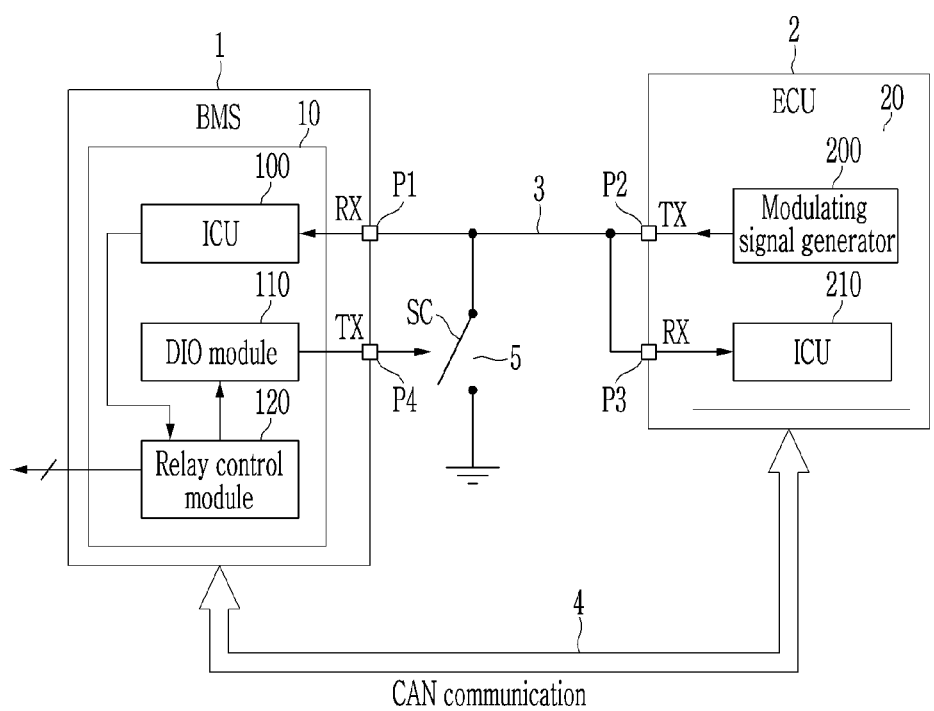
FIG. 1 shows a block diagram of a configuration of an ECU and a BMS to which a communication method according to an exemplary embodiment is applied.

A communication method according to an exemplary embodiment of the present invention is a single line communication method according to a half-duplex scheme using a pulse signal (hereinafter, a modulated pulse signal) obtained by modulating a frequency and a duty cycle between the BMS and the ECU.

First, the ECU may transmit the pulse signal with the modulated frequency and the duty cycle to the BMS so as to instruct a switching operation of a control target relay from among a plurality of relays. The BMS may control the switching operation of the corresponding relay according to the modulating pulse signal received from the ECU. The BMS may control a first voltage change period to a communication line and may feed back to the ECU so as to instruct a switching result of the corresponding relay according to a modulating pulse signal. A state of the relay is one of open and closed, and changing the state of the relay is referred to as a switching operation.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a block diagram of a configuration of an ECU and a BMS to which a communication method according to an exemplary embodiment is applied.

As shown in FIG. 1, the BMS 1 includes a micro control unit (MCU) 10, and the ECU 2 includes a MCU 20.

The MCU 10 includes an input capture unit (ICU) 100, a digital input output (DIO) module 110, and a relay control module 120, and the MCU 20 includes a modulating signal generator 200 and an ICU 210.

The BMS 1 is connected to the ECU 2 through a single line 3 and a CAN communication line 4. The BMS 1 may receive a relay control instruction from the ECU 2 according to a CAN communication using the CAN communication line 4, and may control the relay according to the relay control instruction. However, in the case of a CAN communication defect because of a problem in the CAN communication line 4, etc., it may receive a relay control signal (hereinafter, a modulating pulse signal) from the ECU 2 according to a half-duplex communication using the single line 3.

A modulating pulse signal (MPS) is transmitted to the BMS 1 from the ECU 2 through the single line 3, and the BMS 1 may control the relay according to the modulating pulse signal (MPS) and may apply a first voltage level to the single line 3 as feedback by a period that corresponds to feedback information. In an exemplary embodiment, the first voltage may be a ground level, but the present invention is not limited thereto, and the ECU 2 may be another level for recognizing a change of voltage.

A first end of the single line 3 is connected to an external pin P1 of the ICU 100, and a second end of the single line 3 is connected to an external pin P2 of the modulating signal generator 200 and an external pin P3 of the ICU 210, so a half-duplex communication path between the BMS 1 and the ECU 2 is formed.

The ICU 100 measures a frequency and a duty cycle of the modulating pulse signal (MPS) received through the single line 3. The ICU 100 may generate information (hereinafter, relay control information) on the frequency and the duty cycle of the measured modulating pulse signal (MPS), and may transmit the same (i.e., the relay control information and the duty cycle of the measured MPS) to the relay control module 120.

The relay control module 120 may control a switching operation of the corresponding relay based on the received relay control information. The relay control module 120 may open or close the relay that corresponds to the relay control information from among a plurality of relays according to the relay control information. After completing a relay control operation according to the relay control information, the relay control module 120 may transmit information (hereinafter, relay control result information) for instructing a relay control result to the DIO module 110. The relay control result information may instruct the relay operated according to the relay control information from among a plurality of relays and a voltage change period determined according to a state of the corresponding relay. The relay control module 120 may also request transmission of the modulating pulse signal (MPS) to the BMS 1 from the ECU 2. For example, the relay control module 120 transmits relay control request information for requesting a modulating pulse signal (MPS) to the DIO module 110. The relay control request information may instruct a voltage change period determined according to the relay requiring relay control from among a plurality of relays and a state required of the corresponding relay. An example of the voltage change may be a pull-down.

After receiving relay control result information or relay control request information, the DIO module 110 may control the switching operation of the switch 5 according to the received information and may generate a switching signal (SC) for changing a voltage at the single line 3 for a voltage change period according to relay control result information or relay control request information in the communication line 3. The DIO module 110 may transmit a switching signal (SC) to the switch 5 through an external pin P4. The switch 5 may perform a switching operation according to a level of the switching signal (SC). The switch 5 may be realized with a transistor operable in an electronic way according to the switching signal (SC) or a relay operable in a mechanical way.

The modulating signal generator 200 may generate a modulating pulse signal (MPS) having a frequency and a duty cycle according to a control target relay and an instruction (hereinafter, a relay control instruction) on a state of the control target relay. The modulating signal generator 200 may apply a modulating pulse signal (MPS) to the communication line 3 through the external pin P2. A relay control instruction may be generated by the ECU 2.

The ICU 210 is connected to the single line 3 through the external pin P3, and it may measure the frequency and the duty cycle of the single line 3 so as to detect a voltage change of the single line 3. For example, when the switch 5 is turned on and the single line 3 is grounded, the single line 3 is pulled down. For an On period of the switch 5, the single line 3 is in a pull-down state. The ICU 210 may measure the frequency and the duty cycle of the single line 3 to detect how long the single line 3 is in the pull-down state. The ICU 210 may generate information on a detection result, and the ECU 2 may recognize feedback information on the relay control result based on generated information, and may generate a relay control instruction in response to a relay control request.

Figure 2:
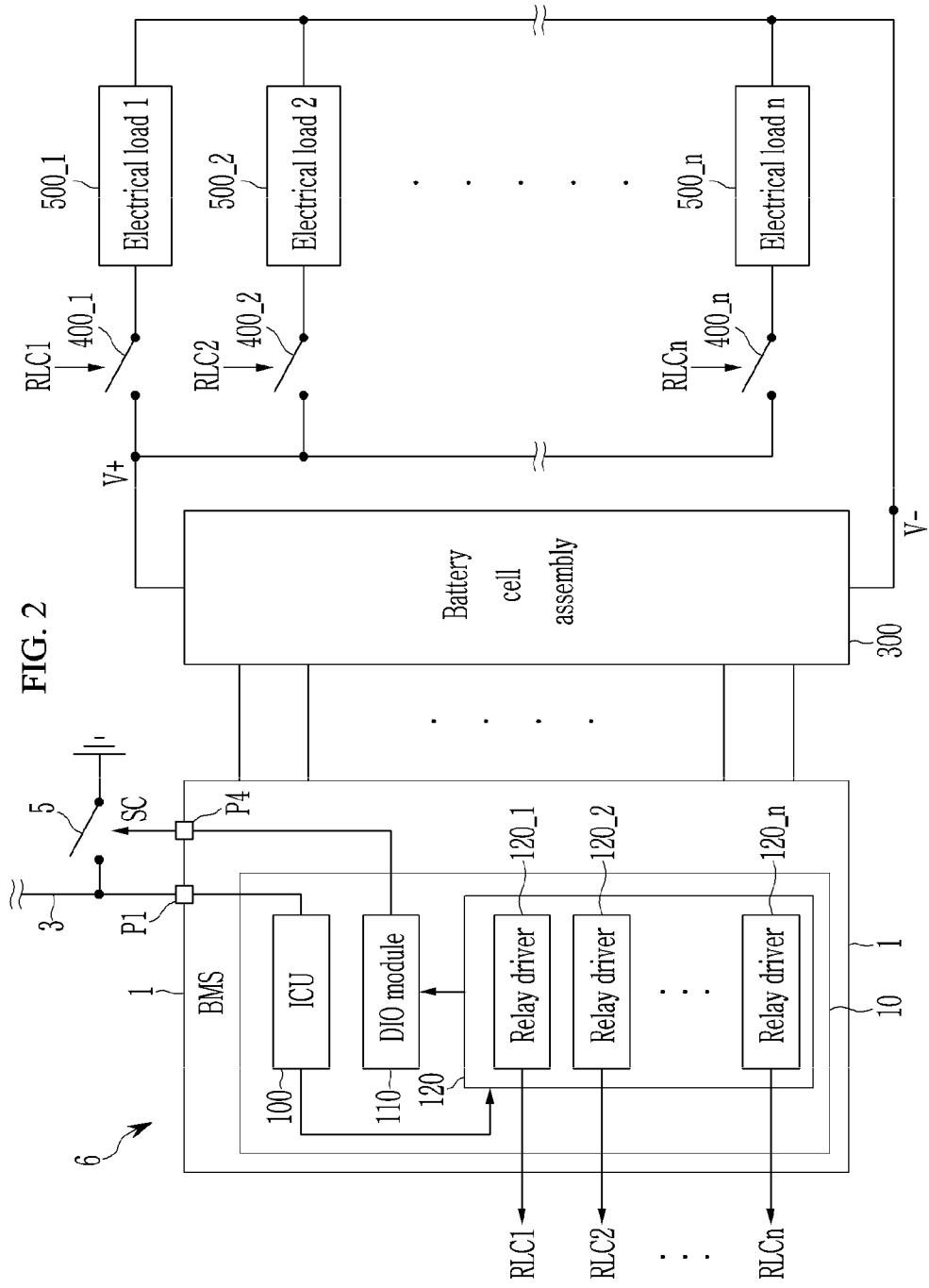
FIG. 2 shows a relay control module and a relay according to an exemplary embodiment.

FIG. 2 shows a relay control module and a relay according to an exemplary embodiment.

In FIG. 2, a battery device 6 includes a BMS 1 and a battery cell assembly 300, and a plurality of relays (400_1 to 400_n) for controlling power supply are electrically connected between the battery cell assembly 300 and a plurality of electrical loads (500_1 to 500_n).

A plurality of battery cells of the battery cell assembly 300 are connected in series/parallel to each other to supply power. The battery cells may be electrically connected to the BMS 1 through a plurality of wires.

As shown in FIG. 2, the relay control module 120 includes a plurality of relay drivers (120_1 to 120_n), and the plurality of relay drivers (120_1 to 120_n) may respectively control the switching operation of the corresponding relay from among a plurality of relays (400_1 to 400_n). The BMS 1 may collect and analyze various information on the battery device including information on a plurality of battery cells, and may control charging and discharging of the battery device, balancing of battery cells, and a protection operation.

The relay control module 120 controls the operation of the corresponding relay driver from among a plurality of relay drivers (120_1 to 120_n) based on relay control information received from the ICU 100.

For example, when the relay control information instructs that the modulating pulse signal (MPS) has a frequency F1 [Hz] and duty cycle (in percentage) D1[%], the relay control module 120 recognizes it as a control instruction for opening the first relay 400_1, and controls the relay driver 120_1 to generate an Off-level relay switching signal RLC1 for opening the relay 400_1. The relay driver 120_1 generates an Off-level relay switching signal RLC1, and the relay 400_1 is turned to Off and enters an open state according to the Off-level relay switching signal RLC1.

The relay control module 120 controls the corresponding relay according to relay control information, and transmits relay control result information to the DIO module 120 so as to transmit a control result to the ECU 2 as a feedback. For example, when the relay 400_1 enters an open state, the relay control module 120 transmits relay control result information for instructing a period of T1 [s] to the DIO module 120, and the DIO module 120 turns on the switch 5 for the period of T1 [s]. The single line 3 is pulled down to a ground voltage for the period of T1 [s].

In another way, when the relay control information instructs that the modulating pulse signal (MPS) has the frequency of F1 [Hz] and D2[%], the relay control module 120 recognizes it as a control instruction for closing the first relay 400_1, and controls the relay driver 120_1 to generate an On-level relay switching signal RLC1 for closing the relay 400_1. The relay driver 120_1 generates an On-level relay switching signal RLC1, and the relay 400_1 is turned to On according to the On-level relay switching signal RLC1 and enters a closed state.

When the relay 400_1 enters the closed state, the relay control module 120 transmits relay control result information for instructing the period of T2 [s] to the DIO module 120, and the DIO module 120 turns on the switch 5 for the period of T2 [s]. The single line 3 is pulled down to the ground voltage for the period of T2 [s].

Figure 3:
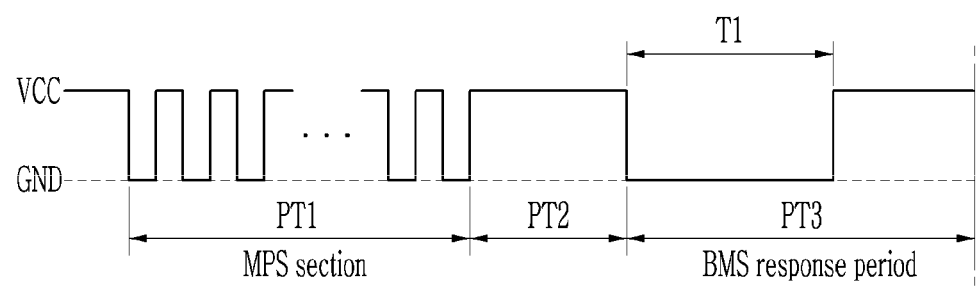
FIG. 3 shows a waveform diagram of a voltage change in a single line according to an exemplary embodiment.

FIG. 3 shows a waveform diagram of a voltage change in a single line according to an exemplary embodiment.

As shown in FIG. 3, the modulating pulse signal (MPS) with the frequency of F1 [Hz] and D1[%] is applied to the single line 3 in a MPS section PT1. A high level of the modulating pulse signal (MPS) is a power supply voltage level VCC for driving the MCU 10, and a low level is illustrated to be the ground, but the present invention is not limited, and the high level and the low level may be appropriately set depending on designs.

For a predetermined period PT2, the input capture unit (ICU) 100 measures the frequency and the duty cycle of the modulating pulse signal (MPS) received in the MPS section PT1, generates relay control information, and transmits the frequency and the duty cycle of the MPS to the relay control module 120, and the relay control module 120 controls the relay 400_1 to be in the open state, and transmits relay control result information for instructing T1 [s] to the DIO module 110.

For a BMS response period PT3, the DIO module 110 turns on the switch 5 for T1 [s] to pull down the voltage at the single line 3 to the ground (GND).

For the period PT2 and the BMS response period PT3 after the MPS section PT1 ends, the ICU 210 measures the frequency and the duty cycle of the single line 3 to detect a pull-down period of the single line 3 and recognize a relay control result.

Table 1 shows relay control information that corresponds to the frequency and the duty cycle of the modulating pulse signal received from the ECU 2, relay control information on states of the relays, and responses of the corresponding BMS 1.

TABLE 1

| Relay control information | | Modulating pulse signal | | BMS response Pull-down |
|---|---|---|---|---|
| Target | State | Frequency | Duty cycle | period |
| Relay 400_1 | Open | F1[Hz] | D1% | T1[s] |
| Relay 400_1 | Closed | F1[Hz] | D2% | T2[s] |
| Relay 400_2 | Open | F2[Hz] | D1% | T3[s] |
| Relay 400_2 | Closed | F2[Hz] | D2% | T4[s] |
| . . . | | | | |

TABLE 1-continued

| Relay control information | | Modulating pulse signal | | BMS response Pull-down |
| --- | --- | --- | --- | --- |
| Target | State | Frequency | Duty cycle | period |
| Relay 400_n | Open | Fn[Hz] | D1% | Tk − 1[s] |
| Relay 400_n | Closed | Fn[Hz] | D2% | Tk[s] |

In Table 1, a reciprocal number of a minimum frequency from among frequencies F1 to Fn must be smaller than the minimum value of the pull-down periods T1 to Tk. This is to distinguish information transmitted/received through the single line 3.

As can be known from Table 1, specific frequencies are allocated to a plurality of relays, the duty cycle when the state of each relay is open is D1%, the duty cycle when it is closed is D2%, and the period (e.g., T1 [s]) for instructing a time when a relay control result that is a BMS response is open may be different from the period (e.g., T2 [s]) for instructing a time when it is closed.

Table 1 shows an exemplary embodiment, the present invention is not limited thereto, and it is modifiable according to designs in a range of the frequency bandwidth and the duty cycle recognizable by the BMS 1 and the ECU 2.

The relay control module 120 may generate relay control request information, and the DIO module 110 may control the switch 5 according to relay control request information and may pull down the single line 3.

For example, the relay control module 120 transmits relay control request information for instructing Tm[s] to the DIO module 110, and the DIO module 110 turns on the switch 5 for Tm[s] according to relay control request information. The ICU 210 measures the frequency and the duty cycle of the single line 3 to detect the pull-down period Tm[s] of the single line 3, and outputs a detection result to the ECU 2. The ECU 2 may generate a relay control instruction for opening the relay 400_1 according to a detection result, and may transmit the same to the modulating signal generator 200.

When the relay control module 120 requests relay control, it may transmit trigger information for notifying it to the DIO module 110 before relay control request information. The DIO module 110 may control the switching operation of the switch 5 according to trigger information to control the voltage waveform of the single line 3 to have a specific frequency and duty cycle. The ICU 210 may recognize that relay control request information will be transmitted when measuring the specific frequency and the duty cycle through the single line 3. The frequency and the duty cycle of the single line 3 measured after recognition correspond to relay control request information, and the ICU 210 detects Tm[s] that corresponds to relay control request information, and outputs a detection result that corresponds to relay control request information to the ECU 2. The ECU 2 may generate a relay control instruction according to a detection result and may transmit the same to the ICU 200.

As described, according to an exemplary embodiment of the present invention, normal relay control is possible when there is a CAN communication problem between the BMS and the higher-level ECU.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A battery management system (BMS) configured to be connected to an electronic control unit (ECU) by CAN communication and half-duplex communication through a single line, comprising:
   an input capture unit (ICU) configured to, when the CAN communication has a defect, measure a frequency and a duty cycle of a modulating pulse signal (MPS) through the single line, and generate relay control information;
   a relay control module configured to generate a relay control signal for controlling a switching operation of a corresponding relay from among a plurality of relays based on the relay control information, and generate relay control result information for instructing a control result of the corresponding relay; and
   a digital input output (DIO) module configured to change a voltage at the single line for a period based on the relay control result information to cause the ICU to transmit relay control result information to the ECU,
   wherein the plurality of relays are electrically connected between a battery device including the BMS and an electrical load.

2. The BMS of claim 1, wherein:
   the relay control module generates relay control request information and transmits the relay control request information to the DIO module, and
   the DIO module changes the voltage at the single line according to the relay control request information.

3. The BMS of claim 1, wherein
   the relay control module includes a plurality of relay drivers for transmitting a plurality of relay control signals to the plurality of relays, and the plurality of relays are respectively opened or closed according to a corresponding relay control signal from among the plurality of relay control signals.

4. The BMS of claim 1, wherein
   the relay control module controls a corresponding relay from among the plurality of relays according to the relay control information, and generates the relay control result information for instructing another period according to a state of the corresponding relay.

5. The BMS of claim 1, wherein
   a frequency of the modulating pulse signal is different for the plurality of relays, and
   a duty cycle of the modulating pulse signal is different according to respective states of the plurality of relays.

6. An electronic control unit (ECU) connected to a battery management system (BMS) by CAN communication and half-duplex communication through a single line, comprising:
   a modulating signal generator configured to, when the CAN communication is bad, generate a modulating pulse signal with a frequency and a duty cycle according to a relay control instruction on a control target relay from among a plurality of relays and a state of the control target relay; and
   an input capture unit (ICU) configured to detect a change of voltage at the single line by measuring a frequency and a duty cycle of the single line,
   wherein the plurality of relays are respectively electrically connected between a battery device of the BMS and a corresponding electrical load.

7. The ECU of claim 6, wherein
the ICU measures a frequency and a duty cycle of the single line, and outputs the relay control request information to the ECU when detecting a change of voltage of the single line for a period that corresponds to relay control request information.

8. The ECU of claim 7, wherein
the ECU generates a relay control instruction according to the relay control request information, and outputs the relay control instruction to the modulating signal generator.

9. The ECU of claim 6, wherein
the modulating pulse signal has different frequencies for the respective relays, and
the modulating pulse signal has different duty cycles for states of the respective relays.

10. A communication method between an electronic control unit (ECU) and a battery management system (BMS) connected by CAN communication and half-duplex communication through a single line, comprising:
generating, by the ECU, a modulating pulse signal with a frequency and a duty cycle according to a relay control instruction on a control target relay from among a plurality of relays and a state of the control target relay, when the CAN communication has a defect;
generating, by the BMS, relay control information by measuring the frequency and the duty cycle of the modulating pulse signal;
generating, by the BMS, a relay control signal for controlling a switching operation of the control target relay from among a plurality of relays based on the relay control information;
generating, by the BMS, relay control result information for instructing a control result of the control target relay;
changing, by the BMS, a voltage of the single line to transmit relay control result information to the ECU for a period based on the relay control result information; and
detecting, by the ECU, a change of the voltage at the single line by measuring a frequency and a duty cycle of the single line by the ECU,
wherein the plurality of relays are electrically connected between a battery device including the BMS and an electrical load.

11. The communication method of claim 10, further comprising:
changing, by the BMS, the voltage at the single line according to relay control request information;
measuring, the by ECU, the frequency and the duty cycle of the single line, and detecting the change of the voltage at the single line for a period that corresponds to the relay control request information by the ECU; and
generating, by the ECU, a relay control instruction based on the relay control request information when the change of the voltage at the single line is detected.

* * * * *